United States Patent Office 3,117,103
Patented Jan. 7, 1964

3,117,103
BINARY BLENDS OF STYRENE/ACRYLONITRILE COPOLYMER AND (CYANOETHOXY)ETHYL ACRYLATE POLYMER AND METHODS FOR PREPARING THE SAME
James A. Herbig and Ival O. Salyer, Dayton, Ohio, assignors to Monsanto Chemical Company, St. Louis, Mo., a corporation of Delaware
No Drawing. Filed July 21, 1960, Ser. No. 44,285
14 Claims. (Cl. 260—45.5)

This invention relates to styrene/acrylonitrile copolymers. In one aspect, this invention relates to styrene/acrylonitrile copolymer compositions comprising binary blends of styrene/acrylonitrile copolymers and (cyanoethoxy)ethyl acrylate polymers. In another aspect, this invention relates to methods for making binary blends of styrene/acrylonitrile copolymers and (cyanoethoxy) ethyl acrylate polymers.

Copolymers of styrene with acrylonitrile, especially those containing from 90 to 50 parts by weight styrene and, correspondingly, from 10 to 50 parts by weight acrylonitrile, constitute an important class of commercial resins finding widespread use as an injection molding material. Unfortunately styrene/acrylonitrile copolymers of this type have very limited flexibility. In fact, they are comparatively brittle materials which do not show a definite yield point. The tensile strength of such styrene/acrylonitrile copolymers is of the order of only a few percent and the flexural deflection is very small. Thus, many styrene/acrylonitrile copolymers lack toughness. Although plasticizers can be used to improve the toughness of styrene/acrylonitrile copolymers, the plasticized copolymer invariably has a low heat distortion point or softening point which restricts its use and the plasticizers tend to exude from the copolymer over a period of time.

We have discovered that the toughness characteristics of styrene/acrylonitrile copolymers can be improved by blending into said styrene/acrylonitrile copolymers a small amount of a (cyanoethoxy)ethyl acrylate polymer.

An object of this invention is to provide improved styrene/acrylonitrile copolymer compositions.

Another object of this invention is to provide binary polyblend compositions of styrene/acrylonitrile copolymer and (cyanoethoxy)ethyl acrylate polymer.

Another object of this invention is to improve the toughness properties of a styrene/acrylonitrile copolymer composition without significantly lowering the heat distortion temperature of said copolymer.

Another object of this invention is to improve the toughness of a styrene/acrylonitrile copolymer composition without significantly reducing the tensile strength or the flexural strength of said copolymer.

Other aspects, objects and advantages of this invention will be apparent from a consideration of the accompanying disclosure and the appended claims.

In accordance with this invention, improved styrene/acrylonitrile copolymer compositions are made by incorporating small amounts of (cyanoethoxy)ethyl acrylate polymer in said styrene/acrylonitrile copolymer to form a binary polyblend of the same. The novel binary polyblend compositions of this invention comprise a major proportion of a styrene/acrylonitrile copolymer and a minor proportion of a (cyanoethoxy)ethyl acrylate polymer. Ordinarily the binary polyblend compositions of this invention comprise from about 1% to about 15% by weight of (cyanoethoxy)ethyl acrylate polymer and the remainder styrene/acrylonitrile copolymer. Preferably, the styrene/acrylonitrile copolymer polyblend compositions of this invention contain from 2% to 12% by weight of the (cyanoethoxy)ethyl acrylate polymer. Although the above stated proportions give useful as well as preferred compositions, other compositions outside the stated proportions can also be formed with fewer improvements in physical properties and with improvements to a lesser degree than are obtained in the above-disclosed composition.

The binary styrene/acrylonitrile copolymer compositions of this invention can be prepared by either mechanical methods or by polymerization methods to produce polyblends having a high degree of homogeneity. In the mechanical method, the styrene/acrylonitrile copolymer and the preformed (cyanoethoxy)ethyl acrylate polymer are intimately admixed together on a conventional mixing machine of the type normally used for mixing rubber or plastics, e.g., a roll mill, an extruder, or a Banbury mixer. Preferably, the styrene/acrylonitrile copolymer is first placed on the mill roll and, after a small rolling bank has formed in the nip of the rolls, the (cyanoethoxy)ethyl acrylate polymer is added. If desired, the styrene/acrylonitrile copolymer and the (cyanoethoxy) ethyl acrylate polymer, each in a disintegrated or a divided form, can be admixed togethr to form a crude mixture which is then placed on the mill rolls. Regardless of the method by which the mixing of these polymers is accomplished, it is necessary that they be admixed together or worked under sufficient heat and pressure to insure an efficient dispersion of the (cyanoethoxy)ethyl acrylate polymer in the styrene/acrylonitrile copolymer so as to form a homogeneous material. The temperature at which this working or mastication is conducted is not critical so long as the temperature is at least above that where the styrene/acrylonitrile copolymer fuses and not above the temperature where decomposition sets in. Usually a temperature above about 300° F. or 325° F. and less than about 350° F. or 375° F. is sufficient to obtain an adequately intimate combination of the materials. If desired, suitable minor ingredients can also be included in the binary polyblend compositions of this invention, including such ingredients as fillers, dyes, pigments, stabilizers, plasticizers antioxidants, and the like.

In the polymerization method of preparing the novel polyblend compositions of this invention, preformed (cyanoethoxy)ethyl acrylate polymer is admixed in the styrene and acrylonitrile monomers and the resulting material subjected to polymerization. For best results, this polymerization is carried to a high conversion, such as greater than 95% conversion to high molecular weight styrene/acrylonitrile copolymer. In preparing such a polymerization blend, the (cyanoethoxy)ethyl acrylate polymer should be thoroughly and intimately dispersed in the monomeric styrene and acrylonitrile prior to polymerization.

The foregoing procedures are used by way of example and various combinations of the same, or other procedures, can be employed to form a binary blend containing a large proportion of styrene/acrylonitrile copolymer and a minor proprtion of (cyanoethoxy)ethyl acrylate polymer. The preferred method for preparing the novel binary polyblend compositions of this invention is by mechanically mixing the preformed polymers. It will be understood in this specification and claims that the term "blend" or "polyblend" as used herein includes both mechanical blends and blends prepared by polymerizing styrene and acrylonitrile in the presence of preformed (cyanoethoxy)ethyl acrylate polymer.

The copolymers of styrene/acrylonitrile used in the novel polyblend compositions of this invention include copolymers wherein styrene and acrylonitrile are the sole monomers subjected to copolymerization, as well as copolymer prepared from comonomers which also contain other polymerizable unsaturated comonomers in an amount preferably not exceeding 15 weight percent of the total comonomers of styrene and acrylonitrile. Examples of such polymerizable unsaturated comonomers which may be present include α-methyl styrene, vinyl toluene, ethyl acrylate, butyl acrylate, methyl methacrylate, and the like. The copolymer produced, even if other polymerizable unsaturated comonomers are present, should have a high molecular weight. The styrene/acrylonitrile copolymers used in this invention comprise from 90 to 50 parts by weight styrene and, correspondingly, from 10 to 50 parts by weight acrylonitrile; however, other styrene/acrylonitrile copolymer compositions outside this range can also be used with less advantageous results.

The styrene/acrylonitrile copolymers employed in the binary polyblend compositions of this invention are commercially available products and can be made by any of the known styrene/acrylonitrile copolymerization techniques from monomeric material comprising styrene and acrylonitrile either with or without (cyanoethoxy)ethyl acrylate polymer present. One common technique is mass polymerization wherein the only material present in the reaction mixture is the monomers plus any catalyst and any modifier that may be used to affect the molecular weight, plus (cyanoethoxy)ethyl acrylate polymer if it is to be incorporated during the polymerization, and no added solvent or other reaction medium is present. Suitable catalysts for use are those that promote free radicals, e.g. peroxy-type and azo-type catalysts. Examples of such catalysts include benzoyl peroxide, ditertiary butyl peroxide, diacetyl peroxide, dimethyl phenyl hydroperoxy-methane, and α,α′-azo-bisisobutyronitrile. The copolymerization can also be effected by the solvent polymerization technique which is similar to the mass polymerization technique except that a solvent for the monomers and/or polymers is also present during the polymerization. The copolymerization can also be effected advantageously by suspension or emulsion polymerization techniques. Each of these techniques involves the use of a non-solvent for the monomer and polymer, but in the suspension technique the particles of monomer and ultimately the polymer are comparatively large, while in the emulsion procedure the particles are quite small and the product is a stable latex. For suspension polymerization, a reaction medium such as water is used together with a small amount of a suspending agent, for example, tricalcium phosphate, a vinyl acetate-maleic anhydride copolymer product, or the like, to give a suspension of particles in the initial mixture which are not of sufficiently small size as to result in a permanently stable latex as a product. To effect emulsion polymerization, a sufficient amount of emulsifying agent, for example, a water-soluble salt of a sulfonated long-chain alkyl aromatic compound, is employed in suitable quantity along with vigorous agitation whereby an emulsion of the reactants in water is formed and the product is obtained in the form of a latex. The latex can then be coagulated, if desired, by known methods and the polymer separated from the water. In those embodiments of the invention wherein styrene and acrylonitrile are copolymerized in the presence of preformed (cyanoethoxy)-ethyl acrylate polymer, the preformed polymer may tend to make it more difficult to form an emulsion than in the case of the monomers alone. However, the emulsion technique has certain advantages particularly in that a very rapid and complete conversion to high molecular weight product is obtained. Conventional recipes and procedures for effecting mass, suspension, and emulsion copolymerization of styrene with acrylonitrile are so well known to those skilled in the art that they need not be reiterated here. Emulsion and suspension polymerization can be effected at temperatures which are chosen in accordance with the catalyst system used but which may, for example, be from 50° C. to 100° C. Mass polymerization is usually most advantageously effected at temperatures within the range of 25° C. to 125° C., and up to 200° C.

The (cyanoethoxy)ethyl acrylate polymers utilized in the binary polyblend compositions of this invention are prepared by polymerizing a cyano ether-ester as, for example, by polymerizing 2-(2-cyanoethoxy)ethyl acrylate obtainable from acrylic acid and 2-(2-hydroxyethoxy)-propionitrile. The preparation of such cyano ether-esters and their formation into vulcanizable rubbery polymers is disclosed and claimed in U.S. Patent No. 2,669,558. The preferred polymer for use in this invention is 2-(2-cyanoethoxy)ethyl acrylate polymer.

The (cyanoethoxy)ethyl acrylate polymers may be prepared by any of the several polymerization methods known to the art; however, the polymer is preferably prepared by an emulsion polymerization technique. In the emulsion polymerization procedure, polymerization of the monomer is effected in the presence of water which contains dissolved therein a suitable peroxy catalyst and an emulsion stabilizing agent. Examples of suitable peroxy catalysts include sodium peroxide, hydrogen peroxide, sodium perborate, the sodium salts of other peroxy acids, the potassium, ammonium and other water-soluble salts of peroxy acids, and any other water-soluble compounds containing a peroxy radical. The quantity of peroxy compounds used as catalysts may be from 0.05 to 2.0% by weight of the polymerizable compound. The emulsion stabilizing agent may be a water-soluble salt of a fatty acid, such as sodium oleate or potassium stearate, a mixture of water-soluble fatty acid salts, soaps prepared by the saponification of animal and vegetable oils, an amino soap such as triethanolamine or dodecylmethyl amine, a salt of a rosin acid or mixtures thereof, a water-soluble salt of a half ester of sulfuric acid and a long-chain alkyl alcohol, a sulfonated hydrocarbon, such as alkylaryl sulfonate, or any other of a wide variety of wetting agents which are in general organic compounds containing both hydrophobic and hydrophillic radicals. The quantity of the emulsion stabilizing agent used will depend upon the particular agent selected, the nature of the monomer, and the conditions of polymerization. But, in general, from 0.1 to 5.0% by weight of the monomer will be employed.

In effecting polymerization of the cyano ether-ester, all of the monomer may be charged to the polymerization reactor at the beginning of the reaction or it may be added periodically or gradually throughout the course of the reaction. Similarly, the catalyst and the emulsifying agent can be introduced either at the start of the reaction or in increments during the reaction. The emulsion polymerization reactants are usually conductor at temperatures between 20° C. and 100° C. and preferably between 40° C. and 60° C. Further information for the preparation of such polymers is to be found in U.S. Patent No. 2,669,558, or, if desired, such polymers may be obtained commercially.

The styrene/acrylonitrile-(cyanoethoxy)ethyl acrylate polyblends of this invention, prepared as described herein, can also have included therein additional materials, such as plasticizers, stabilizers, fillers, dyes, pigments, other polymers, and the like. These materials can be added to the preformed styrene/acrylonitrile copolymer and the preformed (cyanoethoxy)-ethyl acrylate polymer by melting together or otherwise mixing the added materials with the polymers, or can similarly be added to the blends of styrene/acrylonitrile copolymer with (cyanoethoxy)-ethyl acrylate polymer, or can be present during the polymerization of styrene/acrylonitrile monomers containing preformed (cyanoethoxy)ethyl acrylate polymer, provided that such presence does not adversely affect the polymerization process or the product to an undesirable extent.

The advantages, desirability and usefulness of the present invention are illustrated by the following example.

EXAMPLE

Styrene/acrylonitrile copolymer polyblends containing varying proportions of (cyanoethoxy)ethyl acrylate polymer were prepared by mechanically milling the various admixtures on a 3 x 8 inch Thropp mill roll at 174° C. A rough mix was first prepared from the preformed polymers in powdered or pelleted form in a stainless steel beaker and then this rough mix was placed on the heated mill rolls and thoroughly homogenized by intensive hot milling for five minutes or until an adequate dispersion was obtained. The blends were then sheeted and stripped from the mill rolls. After sufficient cooling, the sheets were cut into 1 to 2 inch squares for convenient feeding to an Abbe grinder for grinding into pellet size for injection molding on a one-ounce Watson-Stillman machine.

The physical properties of the blends were then determined on the injection molded samples and are reported in Table I. These properties were determined according to the standard ASTM procedures, more specifically, tensile strength and elongation were determined according to ASTM D-882-46, flexural strength and deflection were determined according to ASTM D-790-49T, and Notched impact strength was determined by the Izod method as set forth in ASTM D-256-47T.

*Table I*

PROPERTIES OF STYRENE/ACRYLONITRILE COPOLYMER AND 2-(2'-CYANOETHOXY) ETHYL ACRYLATE POLYMER POLYBLENDS

| Composition, percent | | Tensile properties | | | | Flexural properties | | Notched Impact strength, ft.-lb./in. |
|---|---|---|---|---|---|---|---|---|
| Styrene/ acrylonitrile copolymer [1] | 2-(2'-cyano- ethoxy)-ethyl acrylate polymer [2] | Yield | | Failure | | Strength, p.s.i. | Deflection, in. | |
| | | Strength, p.s.i. | Elongation, percent | Strength, p.s.i. | Elongation, percent | | | |
| 100.0 | --------- | -------- | ------- | 11,400 | 1.8 | 18,374 | 0.24 | 0.53 |
| 97.5 | 2.5 | 10,891 | 6.0 | 8,336 | 33.3 | 20,200 | 0.80 | 0.65 |
| 95.0 | 5.0 | 10,602 | 6.7 | 8,542 | 35.8 | 19,470 | 0.80 | 0.76 |
| 90.0 | 10.0 | 9,126 | 6.7 | 8,897 | 34.6 | 18,163 | 0.80 | 0.65 |

[1] Bakelite C-11 type styrene/acrylonitrile copolymer containing 72 wt. percent styrene and 28 wt. percent acrylonitrile obtained commercially.
[2] Vyram type 2-(2'-cyanoethoxy)ethyl acrylate polymer obtained commercially.

The data in Table I clearly show the improvement in toughness to be obtained by blending a small amount of 2-(2'-cyanoethoxy)ethyl acrylate polymer into a styrene/acrylonitrile copolymer. For example, the flexural deflection of the styrene/acrylonitrile copolymer was increased from 0.24 inch to a value greater than 0.80 inch, the limit of the particular test equipment used, by blending in amounts of (cyanoethoxy)ethyl acrylate polymer as small as 2.5 weight percent. In addition, the blending of 2.5 weight percent of the (cyanoethoxy)ethyl acrylate polymer in the styrene/acrylonitrile copolymer raised the percent tensile elongation at failure from 1.8% to 33.3%. Similarly, 5.0 weight percent and 10.0 weight percent of the (cyanoethoxy)ethyl acrylate polymer raised both the flexural deflection and the percent tensile elongation at failure corresponding amounts. Although this increase of toughness properties was obtained with some slight loss in tensile strength at failure, there was obtained an increase in flexural strength with the lower amounts of the (cyanoethoxy)ethyl acrylate polymer. Blending of the (cyanoethoxy)ethyl acrylate polymer with the styrene/acrylonitrile copolymer also improved the Notched impact strength of the styrene/acrylonitrile copolymer from a value of 0.53 ft.-pound/inch to values of 0.65 and 0.76 ft.-pound/inch. These binary polyblends were translucent in appearance and could be readily injection molded to obtain products having good surface gloss.

The polyblend compositions of this invention can be subjected to injection or compression molding and other operations which are standard for styrene/acrylonitrile copolymers. These polyblends can be used to make molded structures as well as plastic sheets suitable for cutting or otherwise converted to an intended use. They can also be mixed with other materials, such as pigments, plasticizers, natural synthetic resins, fillers, and the like, according to procedures well known to those skilled in the art.

Reasonable variation and modification of the invention as described are possible, the essence of which is that there have been provided binary polyblend compositions of styrene/acrylonitrile copolymer comprising a major amount of a styrene/acrylonitrile copolymer and a minor amount of a (cyanoethoxy)ethyl acrylate polymer, and methods for preparing the same.

What is claimed is:

1. A styrene/acrylonitrile copolymer polyblend composition comprising 85% to 99% by weight of a styrene/acrylonitrile copolymer and from 1% to 15% by weight of (cyanoethoxy)ethyl acrylate homopolymer.

2. A styrene/acrylonitrile copolymer polyblend composition comprising styrene/acrylonitrile copolymer and from 1% to 15% by weight of (cyanoethoxy)ethyl acrylate homopolymer.

3. A styrene/acrylonitrile copolymer polyblend composition comprising styrene/acrylonitrile copolymer and from 1% to 15% by weight of (cyanoethoxy)ethyl acrylate homopolymer, said styrene/acrylonitrile copolymer comprising from 50% to 90% by weight styrene and from 50% to 10% by weight of acrylonitrile.

4. A styrene/acrylonitrile copolymer polyblend composition comprising 85% to 99% by weight of a styrene/acrylonitrile copolymer containing from 50% to 90% by weight styrene and from 50% to 10% by weight acrylonitrile based on the weight of comonomers polymerized and from 1% to 15% by weight of (cyanoethoxy)ethyl acrylate homopolymer.

5. A styrene/acrylonitrile copolymer polyblend composition comprising styrene/acrylonitrile copolymer containing from 50% to 90% by weight styrene and correspondingly from 50% to 10% by weight acrylonitrile based on the weight of comonomers polymerized, and from 2% to 12% by weight of 2-(2'-cyanoethoxy)ethyl acrylate homopolymer.

6. A styrene/acrylonitrile copolymer polyblend composition comprising 85% to 99% by weight of a styrene/acrylonitrile copolymer containing from 50% to 90% by weight of styrene and from 50% to 10% by weight acrylonitrile based on the weight of comonomers polymerized and from 2% to 12% by weight of 2-(2'-cyanoethoxy)-ethyl acrylate homopolymer.

7. A styrene/acrylonitrile copolymer polyblend composition comprising about 97.5% by weight of a styrene/acrylonitrile copolymer containing 72% by weight styrene and 28% by weight acrylonitrile based on the weight of comonomers polymerized, and about 5.0% by weight 2-(2'-cyanoethoxy)ethyl acrylate homopolymer.

8. A styrene/acrylonitrile copolymer polyblend composition comprising about 95% by weight of a styrene/acrylonitrile copolymer containing 72% by weight styrene and 28% by weight acrylonitrile based on the weight of comonomers polymerized, and about 5.0% by weight 2-(2'-cyanoethoxy)ethyl acrylate homopolymer.

9. A styrene/acrylonitrile copolymer polyblend composition comprising about 90.0% by weight of a styrene/acrylonitrile copolymer containing 72% by weight styrene and 28% by weight acrylonitrile based on the weight of comonomers polymerized, and about 10.0% by weight 2-(2'-cyanoethoxy)ethyl acrylate homopolymer.

10. A method for preparing a binary polyblend composition of a styrene/acrylonitrile copolymer with (cyanoethoxy)ethyl acrylate homopolymer, said method comprising mechanically admixing preformed styrene/acrylonitrile copolymer with from 1% to 15% by weight of the composition of preformed (cyanoethoxy)ethyl acrylate homopolymer.

11. A method for preparing a binary polyblend composition of a styrene/acrylonitrile copolymer and (cyanoethoxy)ethyl acrylate homopolymer, said method comprising copolymerizing styrene and acrylonitrile comonomers containing from 1% to 15% by weight of the composition of a preformed (cyanoethoxy)ethyl acrylate homopolymer.

12. A method for preparing a binary polyblend composition of a styrene/acrylonitrile copolymer and 2-(2'-cyanoethoxy)ethyl acrylate homopolymer, said method comprising mechanically admixing preformed styrene/acrylonitrile copolymer containing 72% by weight styrene and 28% by weight acrylonitrile based on the weight of comonomers polymerized, with 2.5% by weight 2-(2'-cyanoethoxy)ethyl acrylate homopolymer.

13. A method for preparing a binary polyblend composition of a styrene/acrylonitrile copolymer and 2-(2'-cyanoethoxy)ethyl acrylate homopolymer, said method comprising mechanically admixing preformed styrene/acrylonitrile copolymer containing 72% by weight styrene and 28% by weight acrylonitrile based on the weight of comonomers polymerized, with 5.0% by weight 2-(2'-cyanoethoxy)ethyl acrylate homopolymer.

14. A method for preparing a binary polyblend composition of styrene/acrylonitrile copolymer and 2-(2'-cyanoethoxy)ethyl acrylate homopolymer, said method comprising mechanically admixing preformed styrene/acrylonitrile copolymer containing 72% by weight styrene and 28% by weight acrylonitrile, based on the weight of comonomers polymerized, with 10.0% by weight 2-(2'-cyanoethoxy)ethyl acrylate homopolymer.

References Cited in the file of this patent
UNITED STATES PATENTS
2,824,852    Kern ------------------ Feb. 25, 1958

UNITED STATES PATENT OFFICE
CERTIFICATE OF CORRECTION

Patent No. 3,117,103            January 7, 1964

James A. Herbig et al.

It is hereby certified that error appears in the above numbered patent requiring correction and that the said Letters Patent should read as corrected below.

Column 2, line 21, for "togethr" read -- together --; line 56, for "proptrion" read -- proportion --; column 4, line 47, for "conductor" read -- conducted --; column 6, line 70, for "5.0%" read -- 2.5% --.

Signed and sealed this 2nd day of June 1964.

(SEAL)
Attest:

ERNEST W. SWIDER            EDWARD J. BRENNER
Attesting Officer            Commissioner of Patents